March 9, 1937.  L. A. TROFIMOV  2,073,382
MOTOR CONTROL SYSTEM
Filed March 17, 1934

Inventor
Lev A. Trofimov
By Justin W. Macklin
Attorney

March 9, 1937.  L. A. TROFIMOV  2,073,382
MOTOR CONTROL SYSTEM
Filed March 17, 1934  2 Sheets-Sheet 2

Inventor
Lev A. Trofimov,
By Justin W. Macklin,
Attorney

Patented Mar. 9, 1937

2,073,382

UNITED STATES PATENT OFFICE 2,073,382

MOTOR CONTROL SYSTEM

Lev A. Trofimov, Cleveland Heights, Ohio, assignor to The Electric Controller & Manufacturing Company, Cleveland, Ohio, a corporation of Ohio Application March 17, 1934, Serial No. 716,193

6 Claims. (Cl. 172—288)

This invention relates to a control system adapted for use with electric motors and is a continuation in part of my copending application Serial No. 271,164, filed April 19, 1928, maturing as Patent No. 1,980,736. The invention relates particularly to an improved system for automatically cutting out the starting resistance in a motor circuit during acceleration of the motor.

It further provides for introducing a time delay between the energization of the successive resistance cutting out switches, the time delay being responsive to the value of the current taken by the motor during acceleration.

Various means have heretofore been provided for automatically cutting out the starting resistance in a motor circuit so that the current taken by the motor will not exceed certain predetermined values. One such system employs a definite time delay between the closing of each of the switches, but this has the disadvantage that if the time delay periods are adjusted for a given load, the periods are too long for lighter loads and too short for heavier loads.

Another such system employs current limit control in the motor circuit. As is well known a motor when running generates a voltage which is opposite to that supplied to the motor and which reduces the strength of the current supplied to the motor, the strength of the voltage generated by the motor increasing as the motor speed increases so that the current in the circuit decreases as the motor accelerates. In the current limit control system the relays are operated in response to variations in the current in the motor circuit, being arranged to cut out the resistance when the current drops to a predetermined value. This system has the disadvantage of not being able to start the motor when the motor is subjected to overloads in starting, such as are frequently encountered as a result of an increase in the friction load in the machine driven by the motor, due to changes in room temperature or other causes.

In such a case the first switch to close admits the normal amount of current to the motor which is insufficient to start the motor because of the abnormal load on the motor, and as no counter E. M. F. is generated by the motor, the current in the circuit does not decrease to allow the first resistance cutting out switch to close and the motor remains connected to the line, current flowing through the motor and starting resistance which may overheat either or both.

An important object of the present invention is to provide a system of motor control having all of the advantages of a definite time delay system and the current limit systems, and which has none of the inherent disadvantage of either system.

Another object of the invention is to provide a system of motor control wherein the time delay devices may be adjusted to provide a suitable acceleration of the motor under normal working conditions and which, without change or adjustment, will properly accelerate the motor under different or changing conditions and under abnormal working conditions.

A further object of the present invention is to provide means for adjusting the time delay periods to suit any particular motor application.

Another object of the present invention is to provide a motor control system incorporating time delay devices in which the time delay interval is constant only for a given value of the current in the circuit to be controlled, and in which the time delay interval varies in response to variations in the value of the current in the circuit to be controlled, the time delay interval being large if the current value is great and being smaller when the current value is less.

A further object of the present invention is to provide a motor control system incorporating time delay devices in which the time delay interval is variable responsive to variations in the value of the current in the circuit to be controlled, but which are not dependent on a variation in the current in the circuit to be controlled in order to be operative.

A further object of the present invention is to provide an improved motor control system.

Other objects of the invention and features of novelty will be apparent from the following description taken in connection with the accompanying drawings in which Fig. 1 is a front elevational view of one form of time delay device which I may employ in the system provided by my invention, the cover being broken away and shown in section;

Figure 1:
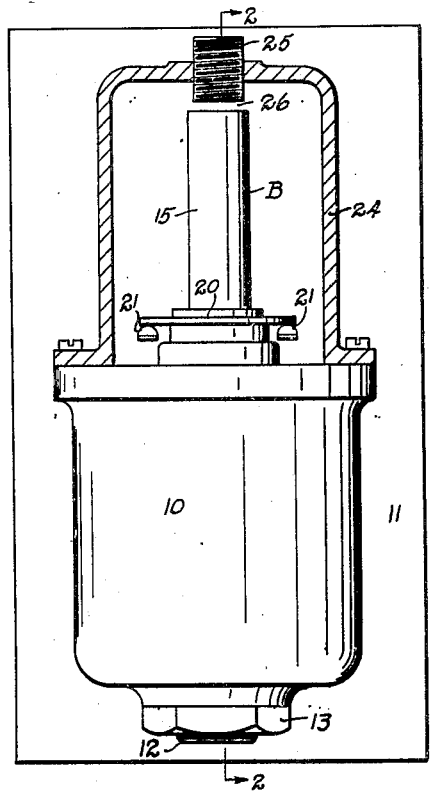
Figure 2:
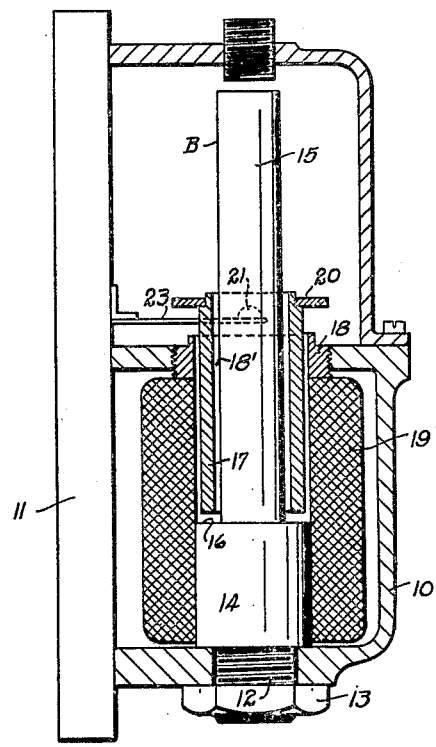
Fig. 2 is a sectional view taken along the line 2—2 of Fig. 1, with parts shown in elevation.

Referring first to Figs. 1 and 2, there is shown one form of time delay device adapted to be employed in the motor control system provided by this invention, and as therein illustrated, 10 designates a casing of magnetic material having its back side open and mounted on the base or slate 11. The vertical magnetic core B has a threaded stem 12 screwed into the bottom of the casing, a jam-nut 13 being turned up on the stem and against the bottom face of the casing. The lower member or part 14 of the core B is of larger diameter than the core member or part 15 above it. The annular shoulder at the junction of the core members 14 and 15 is marked 16.

A non-magnetic member 17 in the form of a cylindrical sleeve, as shown, surrounds the lower portion of the core member 15, and extends up through the top of the casing 10. A magnetic ring or bushing 18 surrounds the cylinder 17 and is screwed into an opening in the top of the casing 10, there being an air gap 18' between the bushing 18 and the core member 15. A winding 19 is seated within the casing 10 and surrounds the core member 14 and that part of the cylinder 17 which is below the top of the casing.

The cylinder 17 carries a disk contact or switch member 20 adapted, when the cylinder is in its lower position, to bridge a pair of relatively fixed contacts 21 of conventional resilient type.

A magnetic cover 24 is seated on the top of casing 10 and against the slate 11 and has a magnetic plug 25 screwed into its top in axial alignment with the core member 15 which extends up into the cover 24, leaving an air gap 26 of desired length between the plug 25 and the core member 15.

The apparatus described may be considered as a current transformer with a movable secondary comprising the cylinder 17 as a single turn winding. The primary of the transformer is the winding 19.

When current is established in the operating coil 19, the growing direct current induces a secondary current in the cylinder 17. Repulsion between the cylinder 17 and the winding 19 causes the cylinder to move upwardly and open the contacts 20 and 21. When the current ceases to grow in the operating winding 19, there is no secondary current in the cylinder 17, and the cylinder 17 begins to fall down through flux suitably provided across the gap 18'.

The flux in the air gap 18' varies in strength in accordance with the strength of the current in the winding 19, being greatest when the current in the winding is of great strength and being weaker when the current in the winding is of a small value. The rate of the return of the movable member 17 is governed by the strength of the flux in the air gap 18', being slow when the flux strength is great and being rapid when the flux strength is small. It is clear therefore that the rate of the return of the movable member 17 and hence the length of time required to close the contacts controlled by the movable member are modified by variations in the strength of the current in the winding 19.

Motion of the cylinder 17 in the magnetic field causes electric currents to be generated in the cylinder, opposing the force of gravity tending to move the member downwardly thereby retarding its downward movement, by which a time delay interval is obtained. At the end of the downward stroke of the cylinder 17, the contacts 20 and 21 are closed.

It has been found that the retarding forces due to induction of current in the member 17 act on both major movements of this member. The restraining forces act on the member 17 as it rises and prevents the member 17 from jumping too high or with so much force that the member 17 impinges on the magnetic plug 25. The restraining force on the member 17 is easily demonstrable by increasing the air gap at 18', it being found that when this air gap is made larger the member 17 jumps much higher. A further result of increasing the size of the air gap at 18' is to decrease the delay period of the member 17 in returning to the position which closes the contacts 21.

The magnetic circuit of the relay has two parallel paths: One through the core B, the casing 10, the bushing 18, and the air gap 18'. The second path is through the core B, the casing 10, the cover 24, adjusting plug 25 and the air gap 26 between the core B and the adjusting plug 25. In both cases the core member B acts to increase the flux set up by current in the winding 19.

At the initial energization of the operating coil 19, the cylinder 17 quickly rises, since the retarding magnetic flux through the air gap 18', has not had time to establish itself to full strength. When the cylinder begins to descend, the flux in the air gap 18' through the bushing 18 is of maximum strength due to the motor current passing during acceleration through the operating winding 19, so that the speed of the downward movement of the cylinder is much slower than its speed of the upward movement. Actual tests have demonstrated that the upward speed of the cylinder 17 is several hundred times its downward speed. The adjusting plug 25 is provided to vary the air gap 26 between the plug 25 and the core B, by means of which more or less flux is shunted away from the air gap 18', thereby changing the strength of the magnetic field in the gap 18'. By these means the time of the downward motion of the tube 17 can be adjusted at will.

The construction and operation of the time delay device shown in Figs. 1 and 2 is fully described and claimed in my copending application Ser. No. 271,164, filed April 19, 1928, maturing as Patent No. 1,980,736, of which this application is a continuation in part.

It will be understood that the time delay device shown in Figs. 1 and 2 operates to close the contacts 21 after a time interval, the length of time interval being variable responsive to changes in the current in the winding 19.

Figure 3:
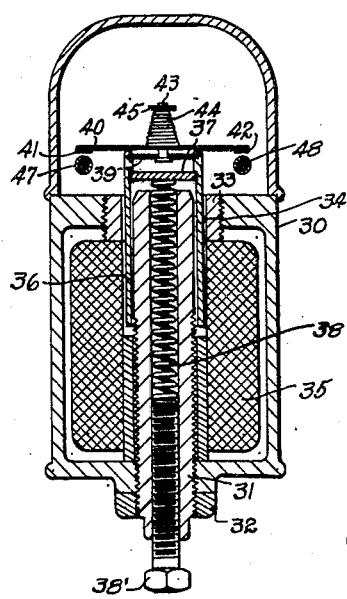
Fig. 3 is a sectional view of another embodiment of the time delay device which I may employ in the system provided by my invention.

I have shown in Fig. 3 another form of time delay switch which I may employ in the motor control system provided by this invention. As therein illustrated, there is a housing 30 constructed of suitable magnetic material and having a core member 31 fitted therein. The core member 31 may be constructed of any suitable magnetic material and preferably is provided with external screw threads which fit into a threaded aperture in the bottom of the housing 30 so that the core member 31 may be adjustably positioned relative to the housing 30. The core 31 may be held in place by means of a lock nut 32 which engages the bottom of the housing 30. The upper end of the core member 31 extends through an aperture in the housing in which is fitted a bushing 33, leaving an air gap 34 between the bushing and the core. A winding 35 is positioned in the housing 30 and surrounds the core member, and a non-magnetic member 36 in the form of a cylindrical sleeve surrounds the upper portion of the core 31 and extends through the air gap between the bushing 33 and the core. Interposed between the lower portion of the core member 31 and the winding 35 is a member 46, the upper end of which acts as a stop for the tube 36 when the latter is in lowered position. A disk 37 of any suitable magnetic material such as soft iron is secured within the member 36 and rests on a spring 38 which is positioned in an aperture in the core 31 and is adjustably supported by a bolt 38' threaded into the core 31. A second disk 39 is secured within the member 36, while a contact bar 40 carrying contacts 41 and 42 rests on the top of the member 36. A retaining pin 43 extends through an aperture in the disk 39 and through the contact bar 40, and has a compression spring 44 mounted thereon, the spring being held in position by means of a washer 45 and a cotter pin or other suitable means. It will be understood that the spring 44 serves to hold the contact carrying bar 40 against the top of the tube 36. The adjusting bolt 38' and the spring 38 are adjusted so that when the winding 35 is de-energized, the contacts 41 and 42 are held slightly out of engagement with the fixed contacts 47 and 48, as shown in Fig. 3. When the winding 35 is energized, the tube 36 moves upwardly very quickly and on continued energization of the winding it moves downwardly through the flux in the air gap 34, the rate of movement varying with the strength of the flux in the air gap 34, which is governed by the strength of the current in the winding 35. When the member 36 has moved downwardly so that the disk 37 approaches the end of the core 31, the attraction between the core and the disk increases and the tube 36 is pulled downwardly so that the contacts 41 and 42 are brought into engagement with the contacts 47 and 48, the spring 38 being compressed.

When current is initiated in the winding 35, the rate of change of the current in the winding and hence the rate of change of flux in the core 31 is maximum. The induced current in the tube 36 will be maximum at this instant and the force for moving the tube from its biased position also will be maximum at this instant. The attraction between the magnetic disk 37 and the upper end of the core 31, on the other hand, increases as the current in the winding 35 and the flux in the core increases, and will be at the minimum when the current is initiated in the winding. The magnetic attraction between the disk 37 and the core 31, therefore, is minimum when the inductive force tending to move the tube 36 is at maximum. Initiation of current in the winding 35 causes the tube 36 to rise very quickly and a continued flow of current in the winding effects a slow movement of the tube downwardly due to the force of gravity acting against the restraining force of the induced currents in the tube created by its downward movement through the magnetic flux in the air gap 34. When the tube 36 descends to its normal position the magnetic attraction between the disk 37 and the core 31 is relatively great as the core is now fully magnetized and the disk is pulled toward the end of the core so that the spring 38 is compressed and the contacts 41 and 42 are held in engagement with the contacts 47 and 48 as long as current continues to flow in the winding 35.

It will be seen that the time delay device shown in Fig. 3, like that shown in Figs. 1 and 2, provides means to control the closing of a pair of contacts after a time delay interval, the length of the time delay interval varying with the strength of the current supplied to the device. The time delay device shown in Fig. 3 differs from the device shown in Figs. 1 and 2, however, in that in the device shown in Fig. 3 the contacts controlled by the device are normally open while in the device shown in Figs. 1 and 2 the contacts are normally closed.

Figure 4:
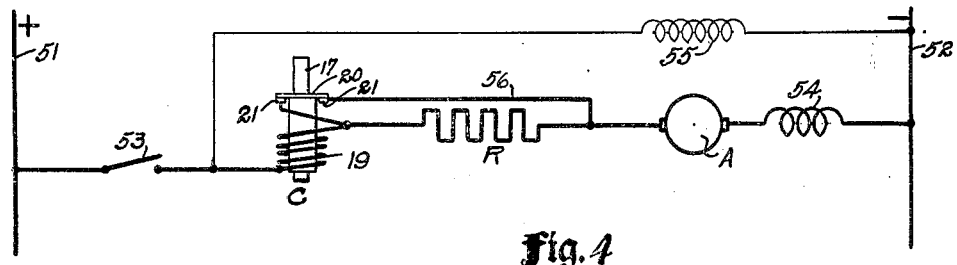
Fig. 4 is a diagrammatic view of an electric motor system embodying the control system provided by my invention.

Referring to Fig. 4 I have shown a diagrammatic view of an electric motor control system embodying the control system provided by my invention. In the system therein illustrated I employ the time delay device shown in Figures 1 and 2, indicated in Figure 4 by the reference character C. The source of current is indicated by wires 51 and 52, and when the switch 53 is closed the current flows from the wire 51 through the winding 19 of the time delay device indicated at C and thence through the resistor R, the armature A, and series field winding 54, to the wire 52. The current also flows from the switch 53, through the shunt field 55 to the wire 52. Upon initiation of current in the winding 19 the tube 17 and the contact carrying member 20 move upwardly very rapidly thereby breaking the circuit between the contacts 21—21.

Subsequently the member 17 moves downwardly and the member 20 engages the contacts 21 to establish a circuit therebetween and to short circuit the resistor R by means of the wire 56. The current flowing in the circuit through the winding 19 will decrease as soon as the armature A starts to rotate because of the counter E. M. F. generated by the motor. The extent of the reduction of the current in the winding 19 will depend on the rate of acceleration of the armature A, the reduction being greater the more rapidly the armature accelerates. The time required for the member 20 to return to its initial position and close the circuit between the contacts 21—21 depends on the current flowing in the winding 19, being longer the greater the current.

It will be understood that if the motor accelerates rapidly, there will be a large decrease in the current in the winding 19 and the tube 17 will descend rapidly and the circuit between the contacts 21 will be closed quickly so that the resistor R will be short circuited after a small time delay interval, and additional current will be supplied to the motor. If, on the other hand, the motor accelerates slowly the time interval which will elapse before the circuit between the contacts 21—21 is completed, and the resistor R short circuited, will be greater.

It will also be seen that if the motor fails to start when the switch 53 is closed, the tube 17 and the member 20 will descend, the rate of movement being slow because of the heavy current flowing through the winding 19, and will complete the circuit so as to short circuit the resistor R and supply additional current to the motor. The additional current will either cause the motor to start or it will cause the overload switches or other safety devices (not shown) to operate and take the motor off the line.

It will be seen that when the switch 53 is closed, current tends to flow through the contacts 20 and 21 of the time delay device, these being normally closed. However, the movable member 17 of the time delay device C moves very quickly after energization of the winding 19 and the contacts 20 and 21 are opened before the current flowing therebetween has had time to rise to its maximum value and the contacts therefore are opened with very little arcing.

From the foregoing it is clear that the control system provided by my invention is responsive to the value of the current taken by the motor during acceleration, and that if the motor accelerates rapidly the time interval required to cut out a section of resistance is less than the time interval required when the motor accelerates slowly. It will also be seen that the motor control system provided by my invention automatically adjusts itself to varying conditions. If the starting load on the motor varies, the rate of acceleration of the motor and the amount of current required by it in starting also vary and the time delay devices employed in this system are responsive to the amount of the current taken by the motor.

In addition it will be seen that in the motor control system provided by my invention that while the time delay devices are responsive to variations in the current taken by the motor during acceleration, they are not dependent entirely upon variations in the current in order to operate, and that they will close the circuit to short circuit the resistor and supply more current to the motor after a time interval even though the motor fails to start and there is little or no variation in the current taken by the motor.

Figure 5:
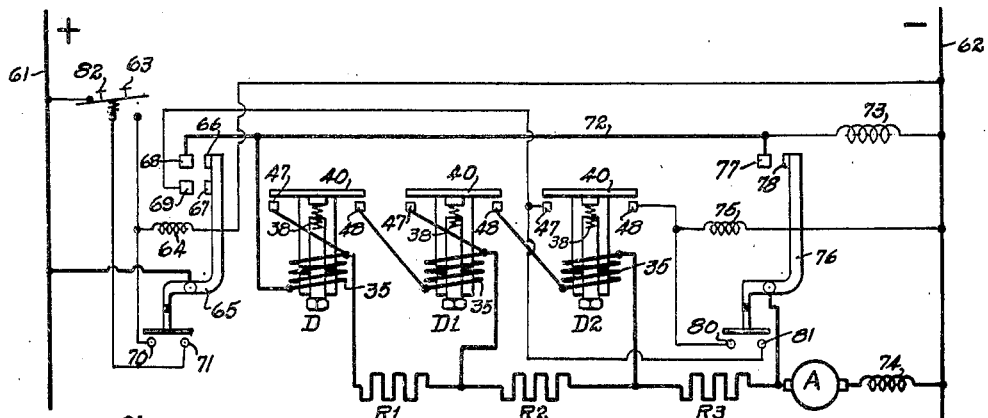
Fig. 5 is a diagrammatic view of another electric motor system embodying the control system provided by my invention.

In Fig. 5 I have shown a diagrammatic view of a different embodiment of the electric motor control system provided by my invention. In the system therein illustrated, a plurality of the type of time delay devices shown in Fig. 3 are employed, these being indicated by the characters D, D1, D2. The system therein illustrated also employs a plurality of resistor sections.

Referring to the drawings the source of current is indicated at 61 and 62, and when the starting button 63 is pressed, the current flows through the winding 64 of the main contactor 65, causing the contacts 66 and 67 to engage the contacts 68 and 69, the main contactor being held in the closed position by its own control circuit contacts 70 and 71. When the main contactor 65 is closed, current flows from the wire 61 through the main contactor and through wire 72, and thence through the shunt field 73 to the other wire 62. Current also flows from the main contactor 65 through the wire 72 to the winding 35 of the first time delay device D and thence through the resistor sections R1, R2 and R3 to the armature A and the series field 74 to the other conductor 62. Upon the initiation of current in the winding 35 of the time delay device D, the movable member of this time delay device quickly moves upwardly and then slowly descends, carrying the contact bar 40 with it and when it has completed its downward motion the contact bar 40 engages the fixed contacts 47 and 48, thereby completing the circuit through the winding 35 of the second time delay device D1 and short circuiting the resistor section R1.

Upon the initiation of current in the winding 35 of the time delay device D1 the movable element of this device moves upwardly and returns so that the contact bar 40 engages the contacts 47 and 48 to complete the circuit through the winding 35 of the third time delay device and to short circuit the resistor section R2. The time delay device D2 operates in the same manner as the time delay devices D and D1 and establishes a circuit between the contacts 47 and 48, which energizes the winding 75 of the contactor 76, causing this contactor to close the contacts 77 and 78, thereby short circuiting the last resistance section R3 and cutting out the windings of the time delay devices D, D1 and D2, and the contacts of the latter are returned to their normal positions by their respective compression springs 38 and they are ready for the next operation of starting the motor. The contactor 76 is held closed through its own control circuit contacts 80 and 81, and the control circuit contacts 67 and 69 of the main contactor 65.

The motor is stopped by pushing the stop push button 82 which de-energizes the winding 64 of the main contactor 65, which in turn de-energizes the winding 75 of the contactor 76, which cuts the motor off the line.

It will be understood that each of the time delay devices D, D1 and D2 are responsive to variations in the current in the circuit of the motor. The time required by each to close the contacts controlled thereby and cut out a resistor section is variable, the time interval being longer the slower the rate of acceleration of the motor and therefore the greater the current taken by the motor, and being shorter if the motor accelerates rapidly, so that there is a large decrease in the current to the motor.

It will be seen also that if the motor fails to start on the closure of the main switch 65 the first time delay device D will close after a time interval and short circuit the resistor section R1, thereby increasing the current to the motor. If this fails to start the motor the second time delay device D1 will close after a time interval after the closure of the first time delay device and will short circuit the second resistor section R2 further increasing the current to the motor. The third time delay device will similarly close after a certain time interval to further increase the current to the motor if the motor has not already been taken off the line by an overload relay, circuit breaker or other safety device (not shown).

Figure 6:
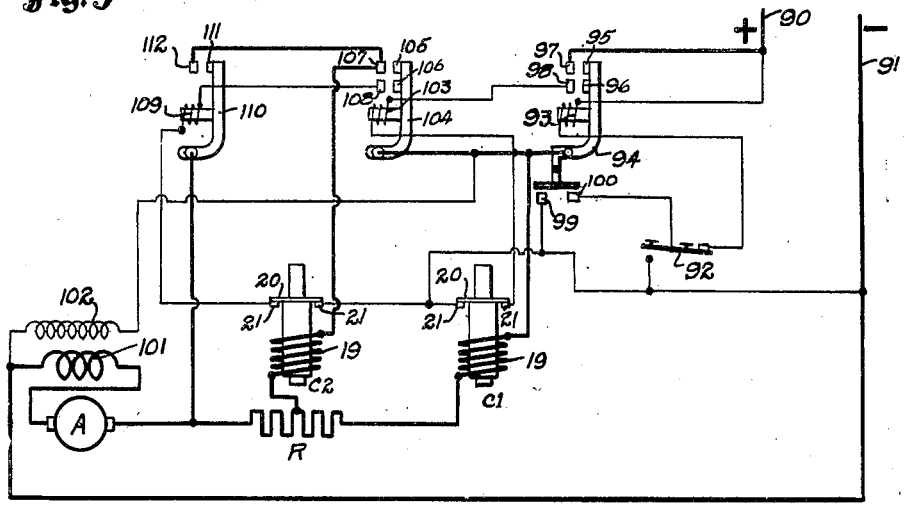
Fig. 6 is a diagrammatic view of another embodiment of an electric motor system employing the control system provided by my invention.

Referring to Fig. 6, which illustrates another embodiment of the motor control system provided by my invention, wherein I employ a plurality of the time delay devices shown in Figures 1 and 2, herein identified by the reference characters C1 and C2, the source of current is indicated at 90 and 91 and it will be seen that when the switch 92 is closed a circuit is established through the winding 93 of the contactor 94, causing this contactor to close and moving the contacts 95 and 96 into engagement with the contacts 97 and 98, the contactor 94 being held closed through its own control circuit contacts 99 and 100. On closure of the contactor 94 current flows from the line 90 through the contacts 97 and 95, thence through the winding 19 of the first time delay device C1, thence through the resistor R to the armature A and the series field winding 101 and thence back to the supply line 91. Current also flows from the contactor 94 through the shunt field 102 and thence back to the supply line 91. On energization of the winding 19 of the time delay device C1, the movable member moves upwardly very rapidly, breaking the circuit between the contacts 21. The movable member then descends, the rate of the descent varying in accordance with the strength of the current in the winding 19 and finally the member 20 engages the contacts 21 to complete the circuit through these contacts.

This completes the circuit through the winding 103 of the contactor 104 and moves the contacts 105 and 106 into engagement with the contacts 107 and 108, thereby completing the circuit through the contactor 104, the contacts 105—107, and through the winding 19 of the second time delay device C2, and thence through the left hand portion only of the resistor R, the right hand portion of the resistor being thereby short circuited. The time delay device C2 operates in the same manner as the time delay device C1 and when the member 20 engages the contacts 21—21 the circuit is completed through the winding 109 of the contactor 110, causing the contacts 111—112 to be brought into engagement so that a circuit is established from the contactor 110 through the motor, thereby completely short circuiting the resistor R, and the windings of the relays C1 and C2.

In the system shown in Fig. 6 the operating winding 103 on the contactor 104 is shown to be initially energized at the same time the winding 19 of the time delay device C1 is energized. However, the operation of the time delay device C1 is much more rapid than that of the magnetically operated contactor 104 so that the movable member of the time delay device will move upwardly and open the circuit between the contacts 21 and through the winding 103 before the contactor 104 has had time to close. The contactor 104 therefore will not operate until the circuit through the contacts controlled by the time delay device C1 is completed.

While the systems shown in Figs. 4 and 6 have been illustrated and described as employing the type of time delay device shown in Figs. 1 and 2, in which the contacts are normally closed, it should be understood, that the form of time delay device shown in Fig. 3 in which the contacts are normally open may be employed if desired. Similarly, while the system shown in Fig. 5 has been illustrated and described as employing the type of time delay device shown in Fig. 3, in which the contacts are normally open, the type of time device shown in Figs. 1 and 2 in which the contacts are normally closed, may be employed if desired.

While certain features of construction of the time delay devices and of the circuit connections which I may employ in the system provided by my invention have been described and illustrated in detail, it should be understood that the invention is not limited to the details, but that numerous changes and modifications may be made without departing from the scope of the following claims.

I claim:

1. In a system for controlling an electric work circuit, current controlling means in said work circuit, shunting means for shunting said current controlling means, contacts for controlling said shunting means, and means responsive to a rise in current in said work circuit for quickly moving said contacts from a normal position, said means being operative for retarding movement of said contacts to a position making effective said shunting means with respect to said current controlling means whereby a time delay is effected, and being responsive at all times to any substantially continuous current in said work circuit for retardation thereby to render said retardation and resultant time delay dependent at each instant of retarded movement upon the amount of current flowing in said work circuit during the particular instant.

2. In a system for controlling an electric work circuit, current controlling means in said work circuit, a circuit for shunting said current controlling means, contacts for controlling said shunt circuit, and means responsive to an increase in current in said work circuit for quickly moving said contacts to an open position, said means being responsive to any magnitude of substantially continuous current in said work circuit for causing retarded movement of said contacts from said open position to a closed position to thereby effect closure of said shunt circuit, said means including a winding energized in response to the current in said work circuit, and a movable member retarded in movement by said winding and operatively related to said contacts and urging the contacts toward said closed position, the urging force of said movable member eventually fully overcoming said retarding influence exerted on said movable member by said winding after a period of time delay resulting from said retarding influence, said retarding influence of said winding being dependent upon the value of current flowing in said work circuit throughout said time delay period.

3. In a system for controlling an electric work circuit, current controlling means in said work circuit, shunting means for shunting said current controlling means, relatively movable contacts subjected to a restraining force for controlling said shunting means, and means responsive to a rise in current in said work circuit for quickly moving said contacts to an open position, said means being responsive to any magnitude of substantially continuous current in said work circuit for causing retarded movement of said contacts from said open position to a closed position, the retarding force being at all times less than the restraining force, said retarded movement effecting a time delay dependent upon the magnitude of current flowing in said work circuit during said retarded movement.

4. In a system for controlling an electric motor circuit, current controlling means in said circuit, shunting means for shunting said current controlling means, contacts for controlling said shunting means, and means responsive to a rise in current in said circuit for quickly moving said contacts from a normal position, said means being operative for controlling movement of said contacts to a position making effective said shunting means with respect to said current controlling means and being responsive to substantially continuous currents in said circuit during rotation and non-rotation of the motor, respectively, for controlling said last movement to effect a time delay dependent upon the value of the current flowing in said circuit during said time delay regardless of rotation or non-rotation of the motor.

5. A system for controlling the acceleration of an electric motor, comprising a supply circuit, starting resistance means in said circuit, shunting means for shunting at least a portion of said starting resistance means, relatively movable contacts subjected to a restraining force for controlling said shunting means, and means responsive to a rise in current in said supply circuit for quickly moving said contacts against the restraining force to an open position and responsive to any magnitude of substantially continuous current in said supply circuit to effect retarded movement of said contacts from said open position to a closed position during a period of time dependent upon the value of current flowing in said supply circuit throughout said period of time, the retarding force at all times being less than the restraining force, and closure of said contacts rendering effective said shunting means with respect to said starting resistance.

6. In a control system for accelerating an electric motor, a source of current supply, an accelerating resistance, means to connect said motor and said source in a circuit including said accelerating resistance, shunting means operable during rotation and non-rotation of said motor and operative to shunt a portion of the accelerating resistance, and thereafter to shunt successively and cumulatively additional portions of the accelerating resistance, means operatively associated with said shunting means for causing said shunting operations to take place after time delay intervals respectively, each of which intervals is dependent in extent upon the value of the circuit current flowing throughout its own duration.

LEV A. TROFIMOV.